(12) United States Patent
Barday

(10) Patent No.: US 10,348,775 B2
(45) Date of Patent: *Jul. 9, 2019

(54) DATA PROCESSING SYSTEMS AND METHODS FOR PERFORMING PRIVACY ASSESSMENTS AND MONITORING OF NEW VERSIONS OF COMPUTER CODE FOR PRIVACY COMPLIANCE

(71) Applicant: OneTrust, LLC, Atlanta, GA (US)

(72) Inventor: Kabir A. Barday, Atlanta, GA (US)

(73) Assignee: OneTrust, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/228,250

(22) Filed: Dec. 20, 2018

(65) Prior Publication Data

US 2019/0124122 A1    Apr. 25, 2019

Related U.S. Application Data

(60) Continuation of application No. 15/882,989, filed on Jan. 29, 2018, now Pat. No. 10,165,011, which is a
(Continued)

(51) Int. Cl.
*H04L 29/06* (2006.01)
*G06Q 10/06* (2012.01)

(52) U.S. Cl.
CPC .......... *H04L 63/20* (2013.01); *G06Q 10/06* (2013.01); *H04L 63/04* (2013.01)

(58) Field of Classification Search
None
See application file for complete search history.

(56) References Cited

U.S. PATENT DOCUMENTS 5,276,735 A    1/1994  Boebert et al.
6,122,627 A    9/2000  Carey et al.
(Continued)

FOREIGN PATENT DOCUMENTS

EP    1394698    3/2004
EP    2031540    3/2009
(Continued)

OTHER PUBLICATIONS

Office Action, dated Dec. 14, 2018, from corresponding U.S. Appl. No. 16/104,393.
(Continued)

*Primary Examiner* — William J. Goodchild
(74) *Attorney, Agent, or Firm* — Brient IP Law, LLC

(57) ABSTRACT

Data processing systems and methods, according to various embodiments, perform privacy assessments and monitor new versions of computer code for updated features and conditions that relate to compliance with privacy standards. The systems and methods may obtain a copy of computer code (e.g., a software application or code associated with a website) that collects and/or uses personal data, and then automatically analyze the computer code to identify one or more privacy-related attributes that may impact compliance with applicable privacy standards. The system may be adapted to monitor one or more locations (e.g., an online software application marketplace, and/or a specified website) to determine whether the application or website has changed. The system may, after analyzing the computer code, display the privacy-related attributes, collect information regarding the attributes, and automatically notify one or more designated individuals (e.g., privacy office representatives) regarding the attributes and information collected.

20 Claims, 7 Drawing Sheets

Related U.S. Application Data continuation of application No. 15/671,073, filed on Aug. 7, 2017, now Pat. No. 9,882,935, which is a division of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016.

(56) References Cited

U.S. PATENT DOCUMENTS

| | | |
|---|---|---|
| 6,253,203 B1 | 6/2001 | Oflaherty et al. |
| 6,275,824 B1 | 8/2001 | Oflaherty et al. |
| 6,374,252 B1 | 4/2002 | Althoff et al. |
| 6,442,688 B1 | 8/2002 | Moses et al. |
| 6,606,744 B1 | 8/2003 | Mikurak |
| 6,662,192 B1 | 12/2003 | Rebane |
| 6,757,888 B1 | 6/2004 | Knutson et al. |
| 6,816,944 B2 | 11/2004 | Peng |
| 6,826,693 B1 | 11/2004 | Yoshida et al. |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,938,041 B1 | 8/2005 | Brandow et al. |
| 6,983,221 B2 | 1/2006 | Tracy et al. |
| 6,985,887 B1 | 1/2006 | Sunstein et al. |
| 6,993,448 B2 | 1/2006 | Tracy et al. |
| 6,993,495 B2 | 1/2006 | Smith, Jr. et al. |
| 7,013,290 B2 | 3/2006 | Ananian |
| 7,017,105 B2 | 3/2006 | Flanagin et al. |
| 7,051,036 B2 | 5/2006 | Rosnow et al. |
| 7,058,970 B2 | 6/2006 | Shaw |
| 7,069,427 B2 | 6/2006 | Adler et al. |
| 7,127,741 B2 | 10/2006 | Bandini et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrish et al. |
| 7,216,340 B1 | 5/2007 | Vinodkrishnan et al. |
| 7,223,234 B2 | 5/2007 | Stupp et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,287,280 B2 | 10/2007 | Young |
| 7,290,275 B2 | 10/2007 | Baudoin et al. |
| 7,313,575 B2 | 12/2007 | Carr et al. |
| 7,353,204 B2 | 4/2008 | Liu |
| 7,370,025 B1 | 5/2008 | Pandit |
| 7,391,854 B2 | 6/2008 | Salonen et al. |
| 7,403,942 B1 | 7/2008 | Bayliss |
| 7,412,402 B2 | 8/2008 | Cooper |
| 7,478,157 B2 | 1/2009 | Bohrer et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,548,968 B1 | 6/2009 | Bura et al. |
| 7,584,505 B2 | 9/2009 | Mondri et al. |
| 7,603,356 B2 | 10/2009 | Schran et al. |
| 7,613,700 B1 | 11/2009 | Lobo et al. |
| 7,620,644 B2 | 11/2009 | Cote et al. |
| 7,630,998 B2 | 12/2009 | Zhou et al. |
| 7,636,742 B1 | 12/2009 | Olavarrieta et al. |
| 7,665,073 B2 | 2/2010 | Meijer et al. |
| 7,668,947 B2 | 2/2010 | Hutchinson et al. |
| 7,673,282 B2 | 3/2010 | Amaru et al. |
| 7,685,561 B2 | 3/2010 | Deem et al. |
| 7,707,224 B2 | 4/2010 | Chastagnol et al. |
| 7,716,242 B2 | 5/2010 | Pae et al. |
| 7,729,940 B2 | 6/2010 | Harvey et al. |
| 7,730,142 B2 | 6/2010 | Levasseur et al. |
| 7,756,987 B2 | 7/2010 | Wang et al. |
| 7,788,632 B2 | 8/2010 | Kuester et al. |
| 7,801,758 B2 | 9/2010 | Gracie et al. |
| 7,853,468 B2 | 12/2010 | Callahan et al. |
| 7,870,540 B2 | 1/2011 | Zare et al. |
| 7,870,608 B2 | 1/2011 | Shraim et al. |
| 7,877,812 B2 | 1/2011 | Koved et al. |
| 7,885,841 B2 | 2/2011 | King |
| 7,917,963 B2 | 3/2011 | Goyal et al. |
| 7,958,494 B2 | 6/2011 | Chaar et al. |
| 7,966,310 B2 | 6/2011 | Sullivan et al. |
| 7,966,663 B2 | 6/2011 | Strickland et al. |
| 7,991,559 B2 | 8/2011 | Dzekunov et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,146,074 B2 | 3/2012 | Ito et al. |
| 8,150,717 B2 | 4/2012 | Whitmore |
| 8,156,158 B2 | 4/2012 | Rolls et al. |
| 8,176,177 B2 | 5/2012 | Sussman et al. |
| 8,176,334 B2 | 5/2012 | Vainstein |
| 8,180,759 B2 | 5/2012 | Hamzy |
| 8,239,244 B2 | 8/2012 | Ginsberg et al. |
| 8,250,051 B2 | 8/2012 | Bugir et al. |
| 8,286,239 B1 | 10/2012 | Sutton |
| 8,364,713 B2 | 1/2013 | Pollard |
| 8,418,226 B2 | 4/2013 | Gardner |
| 8,423,954 B2 | 4/2013 | Ronen et al. |
| 8,429,597 B2 | 4/2013 | Prigge |
| 8,438,644 B2 | 5/2013 | Watters et al. |
| 8,494,894 B2 | 7/2013 | Jaster et al. |
| 8,504,481 B2 | 8/2013 | Motahari et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,583,694 B2 | 11/2013 | Siegel et al. |
| 8,589,183 B2 | 11/2013 | Awaraji et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,620,952 B2 | 12/2013 | Bennett et al. |
| 8,621,637 B2 | 12/2013 | Al-Harbi et al. |
| 8,640,110 B2 | 1/2014 | Kopp et al. |
| 8,681,984 B2 | 3/2014 | Lee et al. |
| 8,683,502 B2 | 3/2014 | Shkedi et al. |
| 8,688,601 B2 | 4/2014 | Jaiswal |
| 8,706,742 B1 | 4/2014 | Ravid et al. |
| 8,712,813 B2 | 4/2014 | King |
| 8,744,894 B2 | 6/2014 | Christiansen et al. |
| 8,763,071 B2 | 6/2014 | Sinha et al. |
| 8,767,947 B1 | 7/2014 | Ristock et al. |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,826,446 B1 | 9/2014 | Liu et al. |
| 8,843,487 B2 | 9/2014 | McGraw et al. |
| 8,893,286 B1 | 11/2014 | Oliver |
| 8,914,263 B2 | 12/2014 | Shimada et al. |
| 8,914,299 B2 | 12/2014 | Pesci-Anderson et al. |
| 8,935,266 B2 | 1/2015 | Wu |
| 8,943,076 B2 | 1/2015 | Stewart et al. |
| 8,959,584 B2 | 2/2015 | Piliouras |
| 8,966,575 B2 | 2/2015 | McQuay et al. |
| 8,977,234 B2 | 3/2015 | Chava |
| 8,983,972 B2 | 3/2015 | Kriebel et al. |
| 8,990,933 B1 | 3/2015 | Magdalin |
| 8,997,213 B2 | 3/2015 | Papakipos et al. |
| 9,003,295 B2 | 4/2015 | Baschy |
| 9,043,217 B2 | 5/2015 | Cashman et al. |
| 9,047,463 B2 | 6/2015 | Porras |
| 9,047,582 B2 | 6/2015 | Hutchinson et al. |
| 9,069,940 B2 | 6/2015 | Hars |
| 9,092,796 B2 | 7/2015 | Eversoll et al. |
| 9,094,434 B2 | 7/2015 | Williams et al. |
| 9,098,515 B2 | 8/2015 | Richter et al. |
| 9,111,295 B2 | 8/2015 | Tietzen et al. |
| 9,135,261 B2 | 9/2015 | Maunder et al. |
| 9,152,820 B1 | 10/2015 | Pauley, Jr. et al. |

(56) References Cited

U.S. PATENT DOCUMENTS

| | | |
|---|---|---|
| 9,158,655 B2 | 10/2015 | Wadhwani et al. |
| 9,172,706 B2 | 10/2015 | Krishnamurthy et al. |
| 9,178,901 B2 | 11/2015 | Xue et al. |
| 9,202,085 B2 | 12/2015 | Mawdsley et al. |
| 9,215,252 B2 | 12/2015 | Smith et al. |
| 9,232,040 B2 | 1/2016 | Barash et al. |
| 9,235,476 B2 | 1/2016 | McHugh et al. |
| 9,241,259 B2 | 1/2016 | Daniela et al. |
| 9,245,126 B2 | 1/2016 | Christodorescu et al. |
| 9,286,282 B2 | 3/2016 | Ling, III et al. |
| 9,288,118 B1 | 3/2016 | Pattan |
| 9,317,715 B2 | 4/2016 | Schuette et al. |
| 9,336,332 B2 | 5/2016 | Davis et al. |
| 9,336,400 B2 | 5/2016 | Milman et al. |
| 9,338,188 B1 | 5/2016 | Ahn |
| 9,344,424 B2 | 5/2016 | Tenenboym et al. |
| 9,348,802 B2 | 5/2016 | Massand |
| 9,355,157 B2 | 5/2016 | Mohammed et al. |
| 9,369,488 B2 | 6/2016 | Woods et al. |
| 9,384,357 B2 | 7/2016 | Patil et al. |
| 9,386,104 B2 | 7/2016 | Adams et al. |
| 9,401,900 B2 | 7/2016 | Levasseur et al. |
| 9,424,021 B2 | 8/2016 | Zamir |
| 9,462,009 B1 | 10/2016 | Kolman et al. |
| 9,465,800 B2 | 10/2016 | Lacey |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,507,960 B2 | 11/2016 | Bell et al. |
| 9,521,166 B2 | 12/2016 | Wilson |
| 9,549,047 B1 | 1/2017 | Fredinburg et al. |
| 9,558,497 B2 | 1/2017 | Carvalho |
| 9,571,509 B1 | 2/2017 | Satish et al. |
| 9,602,529 B2 | 3/2017 | Jones et al. |
| 9,621,357 B2 | 4/2017 | Williams et al. |
| 9,621,566 B2 | 4/2017 | Gupta et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,721,078 B2 | 8/2017 | Cornick et al. |
| 9,721,108 B2 | 8/2017 | Krishnamurthy et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,697 B1 | 9/2017 | Walker |
| 9,762,553 B2 | 9/2017 | Ford et al. |
| 9,767,309 B1 | 9/2017 | Patel et al. |
| 9,800,605 B2 | 10/2017 | Baikalov et al. |
| 9,804,928 B2 | 10/2017 | Davis et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,838,407 B1 | 12/2017 | Oprea et al. |
| 9,838,839 B2 | 12/2017 | Vudali et al. |
| 9,842,349 B2 | 12/2017 | Sawczuk et al. |
| 9,852,150 B2 | 12/2017 | Sharpe et al. |
| 9,877,138 B1 | 1/2018 | Franklin |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,898,769 B2 | 2/2018 | Barday |
| 9,912,625 B2 | 3/2018 | Mutha et al. |
| 9,916,703 B2 | 3/2018 | Douillard et al. |
| 9,923,927 B1 | 3/2018 | Mcclintock et al. |
| 9,953,189 B2 | 4/2018 | Cook et al. |
| 9,961,070 B2 | 5/2018 | Tang |
| 9,983,936 B2 | 5/2018 | Dornemann et al. |
| 9,992,213 B2 | 6/2018 | Sinnema |
| 10,002,064 B2 | 6/2018 | Muske |
| 10,013,577 B1 | 7/2018 | Beaumont et al. |
| 10,025,804 B2 | 7/2018 | Vranyes et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,075,451 B1 | 9/2018 | Hall et al. |
| 10,102,533 B2 | 10/2018 | Barday |
| 10,158,676 B2 | 12/2018 | Barday |
| 10,165,011 B2 | 12/2018 | Barday |
| 10,181,051 B2 | 1/2019 | Barday et al. |
| 2001/0052052 A1* | 12/2001 | Peng ................. H04L 41/00 711/133 |
| 2002/0161594 A1 | 10/2002 | Bryan et al. |
| 2003/0041250 A1 | 2/2003 | Proudler |
| 2004/0098285 A1* | 5/2004 | Breslin .............. G06Q 10/10 713/193 |
| 2004/0186912 A1 | 9/2004 | Harlow et al. |
| 2005/0022198 A1 | 1/2005 | Olapurath et al. |
| 2005/0114343 A1 | 5/2005 | Wesinger et al. |
| 2005/0144066 A1 | 6/2005 | Cope et al. |
| 2005/0197884 A1 | 9/2005 | Mullen, Jr. |
| 2006/0031078 A1 | 2/2006 | Pizzinger et al. |
| 2006/0075122 A1 | 4/2006 | Lindskog et al. |
| 2007/0027715 A1 | 2/2007 | Gropper et al. |
| 2007/0130101 A1 | 6/2007 | Anderson et al. |
| 2007/0157311 A1 | 7/2007 | Meier et al. |
| 2007/0179793 A1 | 8/2007 | Bagchi et al. |
| 2007/0180490 A1 | 8/2007 | Renzi et al. |
| 2007/0244905 A1* | 10/2007 | Ito ..................... G06F 8/65 |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0270203 A1 | 10/2008 | Holmes et al. |
| 2008/0282320 A1 | 11/2008 | Denovo et al. |
| 2008/0288271 A1 | 11/2008 | Faust |
| 2009/0037975 A1 | 2/2009 | Ishikawa et al. |
| 2009/0182818 A1 | 7/2009 | Krywaniuk |
| 2009/0204452 A1 | 8/2009 | Iskandar et al. |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0228786 A1 | 9/2010 | Török |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0333012 A1 | 12/2010 | Adachi et al. |
| 2011/0010202 A1 | 1/2011 | Neale |
| 2011/0137696 A1 | 6/2011 | Meyer et al. |
| 2011/0231896 A1 | 9/2011 | Tovar |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0143650 A1 | 6/2012 | Crowley et al. |
| 2012/0144499 A1 | 6/2012 | Tan et al. |
| 2012/0259752 A1 | 10/2012 | Agee |
| 2013/0018954 A1 | 1/2013 | Cheng |
| 2013/0085801 A1 | 4/2013 | Sharpe et al. |
| 2013/0103485 A1 | 4/2013 | Postrel |
| 2013/0111323 A1 | 5/2013 | Taghaddos et al. |
| 2013/0218829 A1 | 8/2013 | Martinez |
| 2013/0311224 A1 | 11/2013 | Heroux et al. |
| 2013/0326112 A1 | 12/2013 | Park et al. |
| 2013/0332362 A1 | 12/2013 | Ciurea |
| 2013/0340086 A1 | 12/2013 | Blom |
| 2014/0006616 A1* | 1/2014 | Aad ................... G06F 21/552 709/225 |
| 2014/0012833 A1 | 1/2014 | Humprecht |

(56) References Cited

U.S. PATENT DOCUMENTS

| | | |
|---|---|---|
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0047551 A1 | 2/2014 | Nagasundaram et al. |
| 2014/0052463 A1 | 2/2014 | Cashman et al. |
| 2014/0074645 A1 | 3/2014 | Ingram |
| 2014/0089027 A1 | 3/2014 | Brown |
| 2014/0089039 A1 | 3/2014 | McClellan |
| 2014/0109114 A1* | 4/2014 | Mahiddini .............. G06F 9/547 719/328 |
| 2014/0143011 A1 | 5/2014 | Mudugu et al. |
| 2014/0208418 A1 | 7/2014 | Libin |
| 2014/0244309 A1 | 8/2014 | Francois |
| 2014/0244325 A1 | 8/2014 | Cartwright |
| 2014/0244399 A1 | 8/2014 | Orduna et al. |
| 2014/0278663 A1 | 9/2014 | Samuel et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289862 A1 | 9/2014 | Gorfein et al. |
| 2014/0337466 A1 | 11/2014 | Li et al. |
| 2014/0344015 A1 | 11/2014 | Puértolas-Montañés et al. |
| 2015/0019530 A1 | 1/2015 | Felch |
| 2015/0066577 A1 | 3/2015 | Christiansen et al. |
| 2015/0106867 A1 | 4/2015 | Liang |
| 2015/0106948 A1 | 4/2015 | Holman et al. |
| 2015/0106949 A1 | 4/2015 | Holman et al. |
| 2015/0169318 A1* | 6/2015 | Nash ....................... G06F 8/34 717/168 |
| 2015/0178740 A1 | 6/2015 | Borawski et al. |
| 2015/0229664 A1 | 8/2015 | Hawthorn et al. |
| 2015/0242778 A1 | 8/2015 | Wilcox et al. |
| 2015/0254597 A1 | 9/2015 | Jahagirdar |
| 2015/0261887 A1 | 9/2015 | Joukov |
| 2015/0269384 A1 | 9/2015 | Holman et al. |
| 2015/0310575 A1 | 10/2015 | Shelton |
| 2015/0356362 A1 | 12/2015 | Demos |
| 2015/0379430 A1 | 12/2015 | Dirac et al. |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0063523 A1 | 3/2016 | Nistor et al. |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125751 A1 | 5/2016 | Barker et al. |
| 2016/0148143 A1 | 5/2016 | Anderson et al. |
| 2016/0162269 A1 | 6/2016 | Pogorelik et al. |
| 2016/0162279 A1* | 6/2016 | Zamir ....................... G06F 8/65 717/170 |
| 2016/0188450 A1 | 6/2016 | Appusamy et al. |
| 2016/0234319 A1 | 8/2016 | Griffin |
| 2016/0262163 A1 | 9/2016 | Gonzalez Garrido et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0142158 A1 | 5/2017 | Laoutaris et al. |
| 2017/0161520 A1 | 6/2017 | Lockhart, III et al. |
| 2017/0171235 A1 | 6/2017 | Mulchandani et al. |
| 2017/0177324 A1* | 6/2017 | Frank .................... G06F 16/173 |
| 2017/0180505 A1 | 6/2017 | Shaw et al. |
| 2017/0193624 A1 | 7/2017 | Tsai |
| 2017/0201518 A1 | 7/2017 | Holmqvist et al. |
| 2017/0206707 A1* | 7/2017 | Guay .................. G06F 16/2246 |
| 2017/0220964 A1 | 8/2017 | Datta Ray |
| 2017/0249710 A1 | 8/2017 | Guillama et al. |
| 2017/0270318 A1 | 9/2017 | Ritchie |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0308875 A1 | 10/2017 | O'Regan et al. |
| 2017/0330197 A1 | 11/2017 | DiMaggio et al. |
| 2018/0063174 A1 | 3/2018 | Grill et al. |
| 2018/0063190 A1 | 3/2018 | Wright et al. |
| 2018/0091476 A1 | 3/2018 | Jakobsson et al. |
| 2018/0285887 A1 | 10/2018 | Maung |

FOREIGN PATENT DOCUMENTS

| | | |
|---|---|---|
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Office Action, dated Dec. 15, 2016, from corresponding U.S. Appl. No. 15/256,419.

Office Action, dated Dec. 3, 2018, from corresponding U.S. Appl. No. 16/055,998.

Office Action, dated Dec. 31, 2018, from corresponding U.S. Appl. No. 16/160,577.

Office Action, dated Jul. 21, 2017, from corresponding U.S. Appl. No. 15/256,430.

Office Action, dated Mar. 30, 2018, from corresponding U.S. Appl. No. 15/894,890.

Office Action, dated Mar. 30, 2018, from corresponding U.S. Appl. No. 15/896,790.

Office Action, dated May 16, 2018, from corresponding U.S. Appl. No. 15/882,989.

Office Action, dated May 2, 2018, from corresponding U.S. Appl. No. 15/894,809.

Office Action, dated Nov. 1, 2017, from corresponding U.S. Appl. No. 15/169,658.

Office Action, dated Nov. 15, 2018, from corresponding U.S. Appl. No. 16/059,911.

Office Action, dated Nov. 23, 2018, from corresponding U.S. Appl. No. 16/042,673.

Office Action, dated Oct. 10, 2018, from corresponding U.S. Appl. No. 16/041,563.

Office Action, dated Oct. 10, 2018, from corresponding U.S. Appl. No. 16/055,083.

Office Action, dated Oct. 10, 2018, from corresponding U.S. Appl. No. 16/055,944.

Office Action, dated Oct. 15, 2018, from corresponding U.S. Appl. No. 16/054,780.

Office Action, dated Oct. 23, 2018, from corresponding U.S. Appl. No. 16/055,961.

Office Action, dated Oct. 26, 2018, from corresponding U.S. Appl. No. 16/041,468.

Office Action, dated Sep. 1, 2017, from corresponding U.S. Appl. No. 15/619,459.

Office Action, dated Sep. 11, 2017, from corresponding U.S. Appl. No. 15/619,375.

Office Action, dated Sep. 11, 2017, from corresponding U.S. Appl. No. 15/619,478.

Office Action, dated Sep. 19, 2017, from corresponding U.S. Appl. No. 15/671,073.

Office Action, dated Sep. 22, 2017, from corresponding U.S. Appl. No. 15/619,278.

Office Action, dated Sep. 5, 2017, from corresponding U.S. Appl. No. 15/619,469.

Office Action, dated Sep. 6, 2017, from corresponding U.S. Appl. No. 15/619,479.

Office Action, dated Sep. 7, 2017, from corresponding U.S. Appl. No. 15/633,703.

Office Action, dated Sep. 8, 2017, from corresponding U.S. Appl. No. 15/619,251.

(56) References Cited

OTHER PUBLICATIONS

Petition for Post-Grant Review of related U.S. Pat. No. 9,691,090 dated Mar. 27, 2018.
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Restriction Requirement, dated Dec. 31, 2018, from corresponding U.S. Appl. No. 15/169,668.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Restriction Requirement, dated Oct. 17, 2018, from corresponding U.S. Appl. No. 16/055,984.
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
TRUSTe Announces General Availability of Assessment Manager for Enterprises to Streamline Data Privacy Management with Automation, PRNewswire, Mar. 4, 2015.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Invitation to Pay Additional Search Fees, dated Oct. 23, 2018, from corresponding International Application No. PCT/US2018/045296.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Li, Ninghui, et al, t-Closeness: Privacy Beyond k-Anonymity and I-Diversity, IEEE, 2014, p. 106-115.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Notice of Allowance, dated Apr. 12, 2017, from corresponding U.S. Appl. No. 15/256,419.
Notice of Allowance, dated Apr. 25, 2018, from corresponding U.S. Appl. No. 15/883,041.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 24, 2018, from corresponding U.S. Appl. No. 15/619,479.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 31, 2018, from corresponding U.S. Appl. No. 16/159,634.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Jan. 18, 2018, from corresponding U.S. Appl. No. 15/619,478.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jun. 19, 2018, from corresponding U.S. Appl. No. 15/894,890.
Notice of Allowance, dated Jun. 27, 2018, from corresponding U.S. Appl. No. 15/882,989.
Notice of Allowance, dated Jun. 6, 2018, from corresponding U.S. Appl. No. 15/875,570.
Notice of Allowance, dated Mar. 1, 2018, from corresponding U.S. Appl. No. 15/853,674.
Notice of Allowance, dated Mar. 2, 2018, from corresponding U.S. Appl. No. 15/858,802.
Notice of Allowance, dated May 21, 2018, from corresponding U.S. Appl. No. 15/896,790.
Notice of Allowance, dated May 5, 2017, from corresponding U.S. Appl. No. 15/254,901.
Notice of Allowance, dated Nov. 2, 2018, from corresponding U.S. Appl. No. 16/054,762.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Sep. 13, 2018, from corresponding U.S. Appl. No. 15/894,809.

(56) References Cited

OTHER PUBLICATIONS

Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090, dated Apr. 12, 2018.
Office Action, dated Apr. 18, 2018, from corresponding U.S. Appl. No. 15/894,819.
Office Action, dated Aug. 23, 2017, from corresponding U.S. Appl. No. 15/626,052.
Office Action, dated Aug. 24, 2017, from corresponding U.S. Appl. No. 15/169,641.
Office Action, dated Aug. 24, 2017, from corresponding U.S. Appl. No. 15/619,451.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Nov. 19, 2018, from corresponding International Application No. PCT/US2018/046939
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
www.truste.com (1), 200150207, Internet Archive Wayback Machine, www.archive.org,Feb. 7, 2015.
Zeldovich, Nickolai, et al, Making Information Flow Explicit in HiStar, OSDI '06: 7th USENIX Symposium on Operating Systems Design and Implementation, USENIX Association, p. 263-278.
Antunes et al, "Preserving Digital Data in Heterogeneous Environments", ACM, pp. 345-348, 2009 (Year: 2009).
Huner et al, "Towards a Maturity Model for Corporate Data Quality Management", ACM, pp. 231-238, 2009 (Year: 2009).
Newman, "Email Archive Overviews using Subject Indexes", ACM, pp. 652-653, 2002 (Year: 2002).
Office Action, dated Jan. 4, 2019, from corresponding U.S. Appl. No. 16/159,566.
Office Action, dated Jan. 4, 2019, from corresponding U.S. Appl. No. 16/159,628.
Weaver et al, "Understanding Information Preview in Mobile Email Processing", ACM, pp. 303-312, 2011 (Year: 2011).
International Search Report, dated Jan. 7, 2019, from corresponding International Application No. PCT/US2018/055772.
Written Opinion of the International Searching Authority, dated Jan. 7, 2019, from corresponding International Application No. PCT/US2018/055772.
Office Action, dated Jan. 18, 2019, from corresponding U.S. Appl. No. 16/055,984.
Notice of Allowance, dated Jan. 18, 2019 from corresponding U.S. Appl. No. 16/159,635.
International Search Report, dated Jan. 14, 2019, from corresponding International Application No. PCT/US2018/046949.
Written Opinion of the International Searching Authority, dated Jan. 14, 2019, from corresponding International Application No. PCT/US2018/046949.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Jan. 18, 2019, from corresponding International Application No. PCT/US2018/055736.
Agar, Gunes, et al, The Web Never Forgets, Computer and Communications Security, ACM, Nov. 3, 2014, pp. 674-689.
Aghasian, Ertan, et al, Scoring Users' Privacy Disclosure Across Multiple Online Social Networks,IEEE Access, Multidisciplinary Rapid Review Open Access Journal, Jul. 31, 2017, vol. 5, 2017.
Avepoint, AvePoint Privacy Impact Assessment 1: User Guide, Cumulative Update 2, Revision E, Feb. 2015, AvePoint, Inc.
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Decision Regarding Institution of Post-Grant Review in Case PGR2018-00056 for U.S. Pat. No. 9,691,090 B1, Oct. 11, 2018.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Nov. 29, 2017, from corresponding U.S. Appl. No. 15/619,237.

(56) References Cited

OTHER PUBLICATIONS

Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Hacigümüs, Hakan, et al, Executing SQL over Encrypted Data in the Database-Service-Provider Model, ACM, Jun. 4, 2002, pp. 216-227.
Hunton & Williams LLP, The Role of Risk Management in Data Protection, Privacy Risk Framework and the Risk-based Approach to Privacy, Centre for Information Policy Leadership, Workshop II, Nov. 23, 2014.
IAPP, Daily Dashboard, PIA Tool Stocked With New Templates for DPI, Infosec, International Association of Privacy Professionals, Apr. 22, 2014.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Final Office Action, dated Mar. 5, 2019, from corresponding U.S. Appl. No. 16/055,961.
Office Action, dated Mar. 4, 2019, from corresponding U.S. Appl. No. 16/237,083.
Olenski, Steve, For Consumers, Data is a Matter of Trust, CMO Network, Apr. 18, 2016, https://www.forbes.com/sites/steveolenski/2016/04/18/for-consumers-data-is-a-matter-of-trust/#2e48496278b3.
The Cookie Collective, Optanon Cookie Policy Generator, The Cookie Collective, Year 2016, http://web.archive.org/web/20160324062743/https:/optanon.com/.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Office Action, dated Feb. 15, 2019, from corresponding U.S. Appl. No. 16/220,899.
Notice of Allowance, dated Feb. 27, 2019, from corresponding U.S. Appl. No. 16/226,290.
Notice of Allowance, dated Feb. 27, 2019, from corresponding U.S. Appl. No. 16/041,468.
Notice of Allowance, dated Mar. 1, 2019, from corresponding U.S. Appl. No. 16/059,911.
International Search Report, dated Mar. 4, 2019, from corresponding International Application No. PCT/US2018/055773.
International Search Report, dated Mar. 4, 2019, from corresponding International Application No. PCT/US2018/055774.
Office Action, dated Mar. 11, 2019, from corresponding U.S. Appl. No. 16/220,978.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Fung et al, "Discover Information and Knowledge from Websites using an Integrated Summarization and Visualization Framework", IEEE, pp. 232-235 (Year 2010).
Lamb et al, "Role-Based Access Control for Data Service Integration", ACM, pp. 3-11 (Year: 2006).
Maret et al, "Multimedia Information Interchange: Web Forms Meet Data Servers", IEEE, pp. 499-505 (Year: 1999).
Notice of Allowance, dated Mar. 13, 2019, from corresponding U.S. Appl. No. 16/055,083.
Office Action, dated Mar. 12, 2019, from corresponding U.S. Appl. No. 16/221,153.
Petrie et al, "The Relationship between Accessibility and Usability of Websites", ACM, pp. 397-406 (Year: 2007).
Yu, "Using Data from Social Media Websites to Inspire the Design of Assistive Technology", ACM, pp. 1-2 (Year: 2016).
Notice of Allowance, dated Mar. 14, 2019, from corresponding U.S. Appl. No. 16/055,944.
International Search Report, dated Mar. 14, 2019, from corresponding International Application No. PCT/US2018/055736.
Written Opinion of the International Searching Authority, dated Mar. 14, 2019, from corresponding International Application No. PCT/US2018/055736.
Agosti et al, "Access and Exchange of Hierarchically Structured Resources on the Web with the Nestor Framework"IEEE, pp. 659-662 (Year: 2009).

(56) References Cited

OTHER PUBLICATIONS

Notice of Allowance, dated Apr. 2, 2019, from corresponding U.S. Appl. No. 16/160,577.
Notice of Allowance, dated Mar. 25, 2019, from corresponding U.S. Appl. No. 16/054,780.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Office Action, dated Mar. 25, 2019, from corresponding U.S. Appl. No. 16/278,121.
Office Action, dated Mar. 27, 2019, from corresponding U.S. Appl. No. 16/278,120.
Office Action, dated Apr. 5, 2019, from corresponding U.S. Appl. No. 16/278,119.
Restriction Requirement, dated Apr. 10, 2019, from corresponding U.S. Appl. No. 16/277,715.
Office Action, dated Apr. 22, 2019, from corresponding U.S. Appl. No. 16/241,710.
Zhang et al, "Dynamic Topic Modeling for Monitoring Market Competition from Online Text and Image Data", ACM, pp. 1425-1434 (Year: 2015).
Bhargav-Spantzel et al., Receipt Management—Transaction History based Trust Establishment, 2007, ACM, p. 82-91.
Dimou et al, "Machine-Interpretable Dataset and Service Descriptions for Heterogeneous Data Access and Retrieval", ACM, pp. 145-152 (Year: 2015).
Dunkel et al, "Data Organization and Access for Efficient Data Mining", IEEE, pp. 522-529 (Year: 1999).
Office Action, dated May 17, 2019, from corresponding U.S. Appl. No. 16/277,539.
Office Action, dated May 2, 2019, from corresponding U.S. Appl. No. 16/104,628.
Restriction Requirement, dated Apr. 24, 2019, from corresponding U.S. Appl. No. 16/278,122.

\* cited by examiner

DATA PROCESSING SYSTEMS AND METHODS FOR PERFORMING PRIVACY ASSESSMENTS AND MONITORING OF NEW VERSIONS OF COMPUTER CODE FOR PRIVACY COMPLIANCE

CROSS-REFERENCE TO RELATED APPLICATIONS

This application is a continuation of U.S. patent application Ser. No. 15/882,989, filed Jan. 29, 2018, which is a continuation of U.S. patent application Ser. No. 15/671,073, filed Aug. 7, 2017, now U.S. Pat. No. 9,882,935, issued Jan. 30, 2018, which is a divisional of U.S. patent application Ser. No. 15/254,901, filed Sep. 1, 2016, now U.S. Pat. No. 9,729,583, issued Aug. 8, 2017, which claims priority from: (1) U.S. Provisional Patent Application No. 62/360,123, filed Jul. 8, 2016; (2) U.S. Provisional Patent Application No. 62/353,802, filed Jun. 23, 2016; (3) and U.S. Provisional Patent Application No. 62/348,695, filed Jun. 10, 2016, the disclosures of which are hereby incorporated by reference in their entirety.

TECHNICAL FIELD

This disclosure relates to data processing systems and methods for performing privacy assessments and monitoring new versions of computer code for updated features and conditions that relate to compliance with privacy standards.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (i.e., likes and dislikes, as provided or obtained through social media). While not all personal data may be sensitive, in the wrong hands, this kind of information may have a negative impact on the individuals or entities whose sensitive personal data is collected, including identity theft and embarrassment. Not only would this breach have the potential of exposing individuals to malicious wrongdoing, the fallout from such breaches may result in damage to reputation, potential liability, and costly remedial action for the organizations that collected the information and that were under an obligation to maintain its confidentiality and security. These breaches may result not only in financial loss, but loss of credibility, confidence, and trust from individuals, stakeholders, and the public.

Many organizations that obtain, use, and transfer personal data, including sensitive personal data, have begun to address these privacy and security issues. To manage personal data, many companies have attempted to implement operational policies and processes that comply with legal requirements, such as Mayada's Personal Information Protection and Electronic Documents Act (PIPEDA) or the U.S.'s Health Insurance Portability and Accountability Act (HIPPA) protecting a patient's medical information. The European Union's General Data Protection Regulation (GDPR) may fine companies up to 4% of their global worldwide turnover (revenue) for not complying with its regulations (companies must comply by March 2018). These operational policies and processes also strive to comply with industry best practices (e.g., the Digital Advertising Alliance's Self-Regulatory Principles for Online Behavioral Advertising).

Many regulators recommend conducting privacy impact assessments, or data protection risk assessments along with data inventory mapping. For example, the GDPR requires data protection impact assessments. Additionally, the United Kingdom ICO's office provides guidance around privacy impact assessments. The OPC in Mayada recommends personal information inventory, and the Singapore PDPA specifically mentions personal data inventory mapping. Thus, developing operational policies and processes may reassure not only regulators, but also an organization's customers, vendors, and other business partners.

For many companies handling personal data, privacy audits, whether done according to AICPA Generally Accepted Privacy Principles, or ISACA's IT Standards, Guidelines, and Tools and Techniques for Audit Assurance and Control Professionals, are not just a best practice, they are a requirement (for example, Facebook and Google will be required to perform 10 privacy audits each until 2032 to ensure that their treatment of personal data comports with the expectations of the Federal Trade Commission). When the time comes to perform a privacy audit, be it a compliance audit or adequacy audit, the lack of transparency or clarity into where personal data comes from, where it is stored, who is using it, where it has been transferred, and for what purpose is it being used, may bog down any privacy audit process. Even worse, after a breach occurs and is discovered, many organizations are unable to even identify a clear-cut organizational owner responsible for the breach recovery, or provide sufficient evidence that privacy policies and regulations were complied with.

Many of these breaches have their roots in vulnerabilities that may be found in software applications, websites, or other computer code that collect, use and process personal data. The computer code may be an in-house application or solution, or one provided by a third party. When an organization's auditors or privacy team members conduct a privacy audit or assessment, they typically direct questions to software developers in an attempt to obtain answers they need to address compliance with privacy standards. Unfortunately, the auditors and developers do not always use the same vernacular or technical language. As an example, auditors might ask a developer, "List for me all the personal data that you collect," or "are you using any third party code?" A developer, when responding, might, for example, not understand that a user's IP address is considered personal data, especially according to some laws. A developer might also not understand that third party code includes, for example, including snippets of HTML for a hosted library from Google's hosted library, or the use of other software development kits (SDKs). With multitudes of questions during the audit process, the disconnect or language barrier may lead to vulnerabilities. Thus, auditors may ask a multitude of questions, but the disconnect from the language barrier might not lead to the identification or resolution of many privacy-related issues because the auditors are not obtaining the right answers to those questions.

In light of the above, there is currently a need for improved systems and methods for assessing mobile applications, websites, and other computer code for features and conditions that may have an impact on a company's compliance with privacy standards.

SUMMARY

A computer-implemented data processing method, according to various embodiments, for use in automatically monitoring computer code for changes within the context of privacy management comprises: (1) receiving, by one or more computer processors, one or more computer storage locations where a new version of particular computer code may be stored; (2) monitoring, by one or more computer processors, the one or more computer storage locations to determine whether any new versions of the particular computer code have been stored in the one or more computer storage locations by executing the data processing steps of: (A) receiving an indication that new computer code has been stored in the one or more computer storage locations; and (B) comparing the contents of the new computer code with one or more versions of the particular computer code that have been assessed as a part of a previous privacy assessment; and (3) in response to determining that the contents of the new computer code are different from the contents of the one or more versions of the particular computer code that have been assessed as a part of a previous privacy assessment, communicating, by one or more computer processors, an alert to a user indicating that a new version of the particular computer code exists; and (4) in response to determining that the contents of the new computer code are different from the contents of the one or more versions of the particular computer code that have been assessed as a part of a previous privacy assessment: (A) automatically electronically analyzing, by one or more computer processors, the new computer code to determine one or more privacy-related attributes of the new computer code, each of the privacy-related attributes indicating one or more types of personal information the new computer code collects or accesses; (B) electronically displaying to an individual, by one or more computer processors, a list of the one or more privacy-related attributes of the new computer code; (C) electronically displaying, by one or more computer processors, one or more prompts to the individual, wherein each prompt informs the user to input information regarding one or more particular attributes of the one or more privacy-related attributes; and (D) communicating, by one or more computer processors, the information regarding the particular privacy-related attributes to one or more second individuals for use in conducting a privacy assessment of the new computer code.

A computer system, according to various embodiments, for use in automatically monitoring computer code for changes within the context of privacy management comprises at least one processor and memory operatively coupled to the at least one processor, and the computer system is configured for: (1) receiving one or more computer storage locations where a new version of particular computer code may be stored; (2) monitoring the one or more computer storage locations to determine whether any new versions of the particular computer code have been stored in the one or more computer storage locations by executing the data processing steps of: (A) receiving an indication that new computer code having an identifier associated with the particular computer code has been stored in the one or more computer storage locations; and (B) comparing the contents of the new computer code with one or more versions of the particular computer code that have been assessed as a part of a previous privacy assessment; (3) in response to determining that the contents of the new computer code are different from the contents of the one or more versions of the particular computer code that have been assessed as a part of a previous privacy assessment, communicating an alert to a user indicating that a new version of the particular computer code exists; and (4) in response to determining that the contents of the new computer code are different from the contents of the one or more versions of the computer code that have been assessed as a part of a previous privacy assessment: (A) automatically electronically analyzing the new computer code to determine whether the new computer code has any one of a specified plurality of privacy-related attributes; and (B) in response to determining that the new computer code has a particular one of the specified plurality of privacy-related attributes: (1) executing the steps of: (a) electronically displaying one or more prompts to a user requesting that the user input information regarding the particular privacy-related attribute; (b) receiving input information from the user regarding the particular privacy-related attribute; and (c) communicating the input information to a second user for use in a privacy assessment of the new computer code; (2) changing an indicator associated with the new computer code to indicate that, before the new computer code is launched, the attribute should be reviewed by one or more designated individuals; and (3) changing an indicator associated with the new computer code to indicate that, before the new computer code is launched, the new computer code should be modified to not include the particular privacy-related attribute.

A computer-implemented data processing method for use in automatically monitoring computer code for changes within the context of privacy management, the method comprising: (1) receiving, by one or more computer processors, one or more computer storage locations where a new version of particular computer code may be stored; (2) monitoring, by one or more computer processors, the one or more computer storage locations to determine whether any new versions of the particular computer code have been stored in the one or more computer storage locations; (3) in response to determining that one or more new versions of the particular computer code have been stored in the one or more computer storage locations: (A) automatically electronically, by one or more computer processors, analyzing the new computer code to determine one or more privacy-related attributes of the new computer code, each of the one or more privacy-related attributes indicating one or more types of personal information the new computer code collects or accesses; (B) electronically displaying to an individual, by one or more computer processors, a list of the one or more privacy-related attributes of the new computer code; (C) electronically displaying, by one or more computer processors, one or more prompts to the individual wherein each prompt informs the individual to input information regarding the one or more attributes; and (D) communicating, by one or more computer processors, the information regarding the one or more privacy-related attributes to one or more second individuals for use in conducting a privacy assessment of the new computer code.

A computer-implemented data processing method for use in automatically monitoring computer code for changes within the context of privacy management, the method comprising: (1) receiving, by one or more computer processors, one or more computer storage locations where a new version of particular computer code may be stored; (2) monitoring, by one or more computer processors, the one or more computer storage locations to determine whether any new versions of the computer code have been stored in the one or more computer storage locations by executing the data processing steps of: (A) receiving, by one or more computer processors, an indication that new computer code having an identifier associated with the computer code has been stored in the one or more computer storage locations; and (B) comparing, by one or more computer processors, the contents of the new computer code with one or more versions of the computer code that have been assessed as a part of a previous privacy assessment; (3) in response to determining that the contents of the new computer code are different from the contents of the one or more versions of the computer code that have been assessed as a part of a previous privacy assessment, automatically electronically analyzing, by one or more computer processors, the new computer code to determine whether the new computer code has a particular one of a specified plurality of privacy-related attributes; and (4) in response to determining that the new computer code has a particular one of the plurality of privacy-related attributes: (A) executing, by one or more computer processors, the steps of: (i) electronically displaying one or more prompts to a user requesting that the user input information regarding the particular privacy-related attribute; (ii) receiving input information from the user regarding the particular privacy-related attribute; and (iii) communicating the input information to a second user for use in a privacy assessment of the new computer code; (B) changing an indicator associated with the new computer code to indicate that, before the new computer code is launched, the attribute should be reviewed by one or more designated individuals; and (C) changing an indicator associated with the new computer code to indicate that, before the new computer code is launched, the new computer code should be modified to not include the attribute.

BRIEF DESCRIPTION OF THE DRAWINGS

Various embodiments of a system and method for operationalizing privacy compliance and assessing risk of privacy campaigns are described below. In the course of this description, reference will be made to the accompanying drawings, which are not necessarily drawn to scale, and wherein.

DETAILED DESCRIPTION

Figure 1:
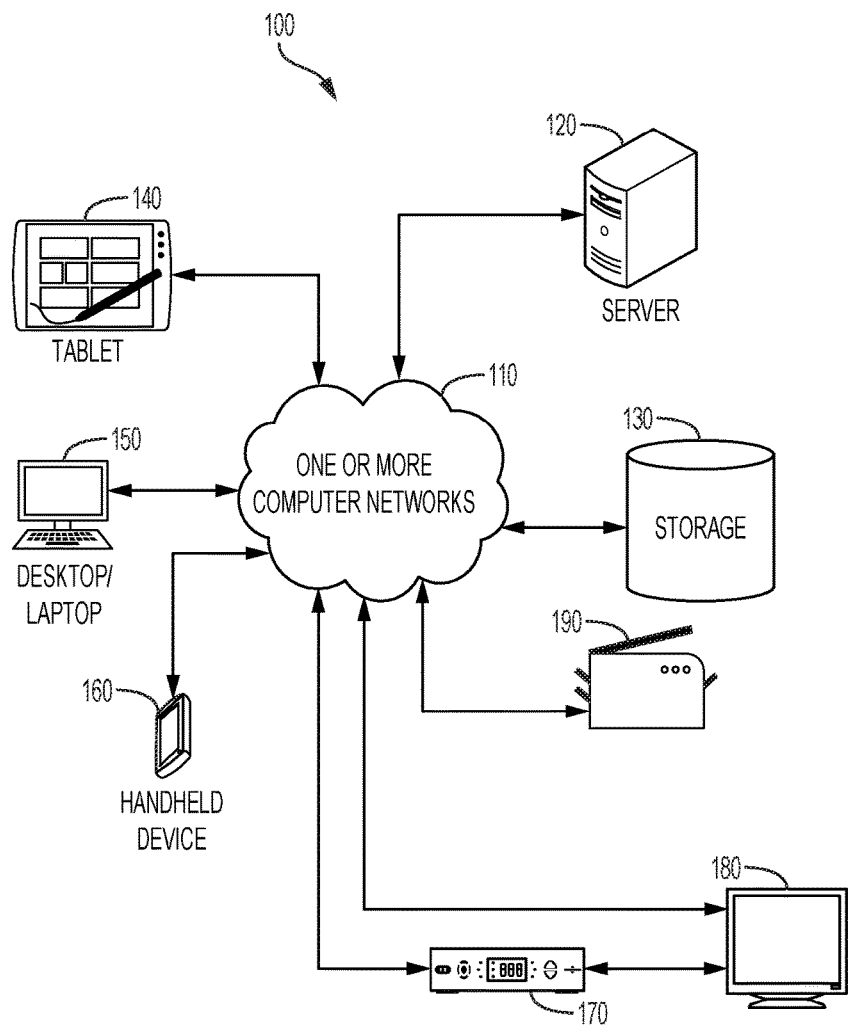
FIG. 1 is a diagram illustrating an exemplary network environment in which various embodiments of the present system and methods for operationalizing privacy compliance may operate.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Various systems and methods for operationalizing privacy compliance are described below. In particular, various systems are described below that automatically determine whether particular computer code (e.g., source code or compiled code) complies with one or more privacy policies. Such systems may operate with or without obtaining information from various users regarding the code.

In particular embodiments, the system is adapted to allow a user to provide the location of computer code (e.g., source code or compiled code) to be analyzed. This location may be, for example, a location (e.g., in local memory or on a third-party server, such as a server associated with an app store, such as Apple's App Store, or the Microsoft Store) of a particular software application or file. If the software code to be analyzed is that of a website, the location may be, for example, the web site's URL.

After the system receives the location of the code, the system may obtain the code by, for example, uploading the code from the specified location, or by scraping the relevant code from a specified website. The system then automatically analyzes the code to determine, for example, whether the code includes any functionality that would be relevant to one or more privacy policies. For example, the system may automatically determine whether the code, when executed, collects personal data in a way that is contrary to one or more applicable laws, and/or contrary to one or more other privacy policies that apply to the code.

As a particular example, the system may analyze the computer code to determine whether the code, when executed, gathers any personal information (such as sensitive personal information) regarding the user in a manner that is contrary to: (1) any applicable law; (2) a privacy policy of a privacy campaign that the software code is being implemented in conjunction with (See U.S. Provisional Patent Application 62/348,695, which, as noted above, is incorporated herein by reference in its entirety, for a more detailed discussion of privacy campaigns); (3) a general privacy policy of an organization implementing the computer code; and/or (4) any contractual provisions (e.g., software terms and conditions) that apply to the code.

In a particular embodiment, the system may use suitable third-party software to determine whether the code, when executed, gathers any personal information. In other embodiments, the system may do so without using third party software.

In various embodiments, upon determining that particular code gathers personal information, the system may send a request to a first user for information as to why the code includes the functionality at issue and whether the functionality could potentially be omitted. For example, if the system determines that the code, when executed, tracks the user's location (e.g., the user's longitude and latitude, the zip code that they're located in, etc.) or web browsing habits, the system may present one or more prompts to a user to input: (1) why the system is tracking the user's location; (2) whether the location-tracking functionality could be omitted from the code, or modified to reduce the resolution of the location-tracking functionality (e.g., reduced from tracking the user's precise longitude and latitude to more generally tracking the zip code or other territorial boundary that they are located in) without having a negative impact on the business purpose of the code; (3) why the system is tracking the user's browsing habits; and/or (4) whether the browser-tracking functionality could be omitted from the code without having a negative impact on the business purpose of the code. The system may present such questions to any suitable user such as, for example: (a) a software developer that is associated with developing the code; (b) an "owner" of a software campaign associated with the code; (c) a privacy officer; and/or (d) an auditor.

The system may then transmit an alert to one or more specified individuals (e.g., indicating that the code includes functionality that may be in violation of one or more applicable privacy policies) along with the answers to the questions referenced above. The specified individuals may then use the answers to determine whether to coordinate modifying the code to comply with the applicable privacy policies (e.g., privacy laws or internal privacy policies).

In particular embodiments, the system may include a Monitoring Module for monitoring a particular piece of software to determine whether the software has changed. If the software changes, the system may, for example: (1) send an alert to an appropriate individual (e.g., a privacy officer) indicating that the software has changed (e.g., a new version of the software has been released); and/or (2) analyze the new version of the code (e.g., as described above) to determine whether the new version of the code violates any applicable privacy policies. The appropriate individual may then take any necessary action to assure compliance with the applicable privacy policies (e.g., coordinate revision of the code and/or a downgrade to the immediate previous version of the code). Various embodiments are described in greater detail below.

In particular embodiments, the system may also, or alternatively, be adapted to scan predetermined software code to automatically determine whether the code, when executed, collects or otherwise uses personal information (e.g., sensitive personal information) and, if so, what types of personal information are being collected. In various embodiments, in response to determining that the code collects certain predetermined types of personal information, the system may associate a particular risk level with the code (and/or a privacy campaign associated with the code) and/or flag the code (and/or a privacy campaign associated with the code) to indicate that, before the code is placed into use (e.g., publically launched and/or a non-testing version of the software version of the software is launched), the code needs to: (1) be modified to not collect one or more types of personal information; and/or (2) be reviewed and approved by an appropriate individual or group (e.g., the individual or group must approve the code including the attribute). Such risk levels and flags may be communicated to users within the context of a risk assessment system, such as one or more of the systems described in U.S. Provisional Patent Application Ser. No. 62/348,695, entitled "Data Processing Systems and Methods for Operationalizing Privacy Compliance and Assessing the Risk of Various Respective Privacy Campaigns and Related Systems and Methods", which was filed on Jun. 10, 2016, and which, as noted above, is incorporated herein by reference in its entirety.

Exemplary Technical Platforms

As will be appreciated by one skilled in the relevant field, a system for performing privacy assessments and monitoring new versions of computer code for updated features and conditions that relate to compliance with privacy standards may be embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of, for example, web, mobile, or wearable computer-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each step of the block diagrams and flowchart illustrations, and combinations of steps in the block diagrams and flowchart illustrations, respectively, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart step or steps.

These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart step or steps. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart step or steps.

Accordingly, steps of the block diagrams and flowchart illustrations support combinations of mechanisms for performing the specified functions, combinations of steps for performing the specified functions, and program instructions for performing the specified functions. It should also be understood that each step of the block diagrams and flowchart illustrations, and combinations of steps in the block diagrams and flowchart illustrations, may be implemented by special purpose hardware-based computer systems that perform the specified functions or steps, or combinations of special purpose hardware and other hardware executing appropriate computer instructions.

Example System Architecture

FIG. 1 is a block diagram of a System 100 according to a particular embodiment. As may be understood from this figure, the System 100 includes one or more computer networks 110, a Server 120, a Storage Device 130 (which may contain one or more databases of information), one or more remote client computing devices such as a tablet computer 140, a desktop or laptop computer 150, or a handheld computing device 160, such as a cellular phone, browser and Internet capable set-top boxes 170 connected with a TV 180, or a smart TV 180 having browser and Internet capability. The client computing devices attached to the network may also include copiers/printers 190 having hard drives. The Server 120, client computing devices, and Storage Device 130 may be physically located in a central location, such as the headquarters of the organization, for example, or in separate facilities. The devices may be owned or maintained by employees, contractors, or other third parties (e.g., a cloud service provider). In particular embodiments, the one or more computer networks 115 facilitate communication between the Server 120, one or more client computing devices 140, 150, 160, 170, 180, 190, and Storage Device 130.

The one or more computer networks 115 may include any of a variety of types of wired or wireless computer networks such as the Internet, a private intranet, a public switched telephone network (PSTN), or any other type of network. The communication link between the Server 120, one or more client computing devices 140, 150, 160, 170, 180, 190, and Storage Device 130 may be, for example, implemented via a Local Area Network (LAN) or via the Internet.

Example Computer Architecture Used within the System

Figure 2:
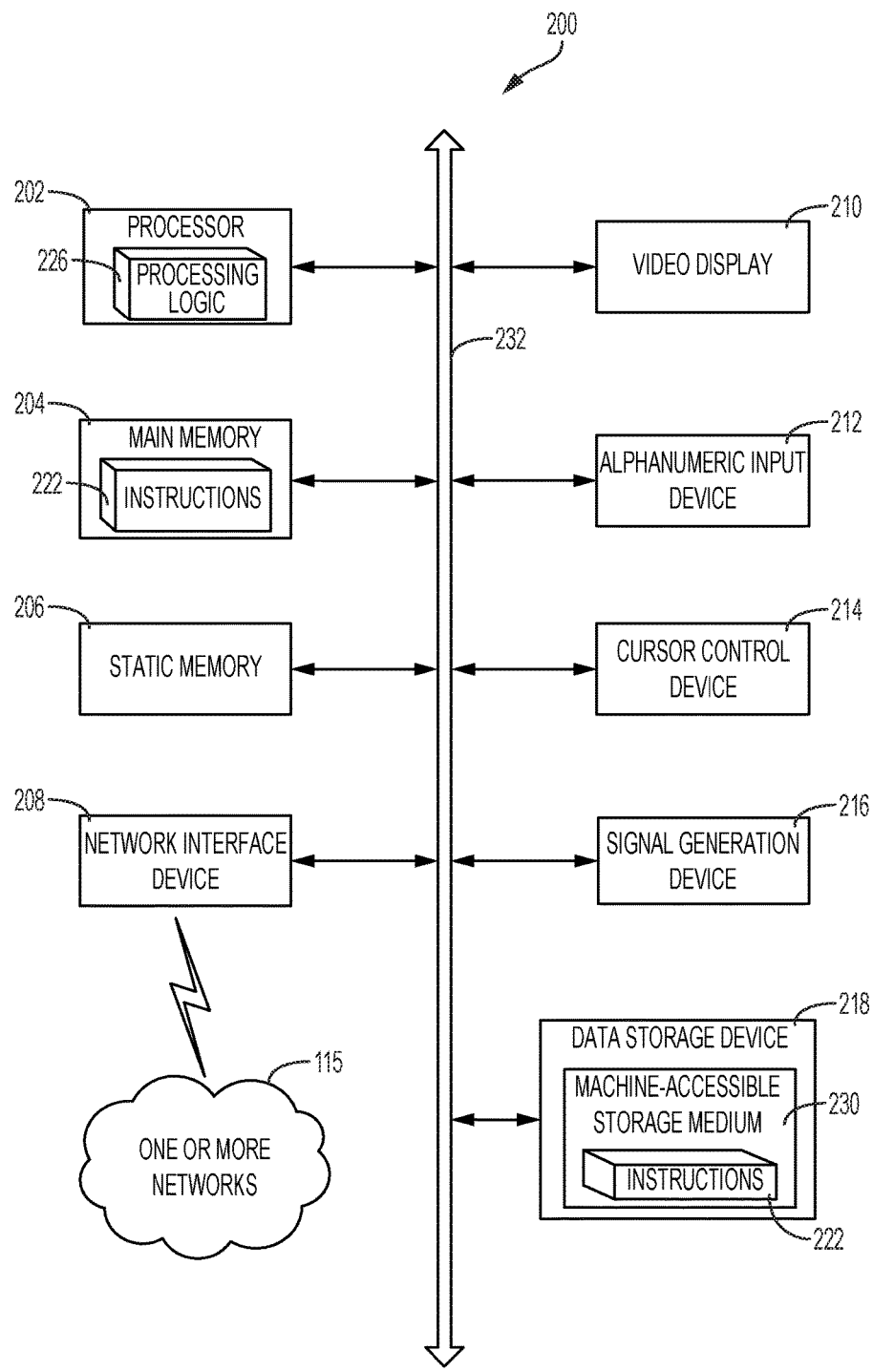
FIG. 2 is a schematic diagram of a computer (such as the server 120, or user device 140, 150, 160, 170, 180, 190) that is suitable for use in various embodiments.

FIG. 2 illustrates a diagrammatic representation of the architecture of a computer 200 that may be used within the System 100, for example, as a client computer (e.g., one of computing devices 140, 150, 160, 170, 180, 190, shown in FIG. 1), or as a server computer (e.g., Server 120 shown in FIG. 1). In exemplary embodiments, the computer 200 may be suitable for use as a computer within the context of the System 100 that is configured to operationalize privacy compliance and assess the risk of privacy campaigns. In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform, for example, any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM)), a static memory 206 (e.g., flash memory or static random access memory (SRAM)), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). The data storage device 218 may include a non-transitory computer-readable storage medium 230 (also known as a non-transitory computer-readable storage medium or a non-transitory computer-readable medium) on which is stored one or more sets of instructions 222 (e.g., software, software modules) embodying any one or more of the methodologies or functions described herein. The software 222 may also reside, completely or at least partially, within main memory 204 and/or within processing device 202 during execution thereof by computer 200—main memory 204 and processing device 202 also constituting computer-accessible storage media. The software 222 may further be transmitted or received over a network 220 via a network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform, for example, any one or more of the methodologies of the present invention. The term "computer-readable storage medium" should accordingly be understood to include, but not be limited to, solid-state memories, optical and magnetic media, etc.

Exemplary System Platform

According to various embodiments, the processes and logic flows described in this specification may be performed by a system (e.g., System 100) that includes, but is not limited to, one or more programmable processors (e.g., processor 202) executing one or more computer program modules to perform functions by operating on input data and generating output, thereby tying the process to a particular machine (e.g., a machine programmed to perform the processes described herein). This includes processors located in one or more of client computers (e.g., client computers 140, 150, 160, 170, 180, 190 of FIG. 1). These devices connected to network 110 may access and execute one or more Internet browser-based program modules that are "served up" through the network 110 by one or more servers (e.g., server 120 of FIG. 1), and the data associated with the program may be stored on one or more storage devices, which may reside within a server or computing device (e.g., Main Memory 204, Static Memory 206), be attached as a peripheral storage device to the one or more servers or computing devices, or attached to the network (e.g., Storage 130).

The System 100 may facilitate the acquisition, storage, maintenance, use, and retention of campaign data associated with a plurality of privacy campaigns within an organization. In doing so, various aspects of the System 100 initiate and create a plurality of individual data privacy campaign records that are associated with a variety of privacy-related attributes and assessment-related metadata for each campaign. These data elements may include, for example: the subjects of the sensitive information, the respective person or entity responsible for each campaign (e.g., the campaign's "owner"), the location where the personal data will be stored, the entity or entities that will access the data, the parameters according to which the personal data will be used and retained, the Risk Level associated with a particular campaign (as well as assessments from which the Risk Level is calculated), an audit schedule, and other attributes and metadata.

The System 100 may also be adapted to facilitate the setup and auditing of each privacy campaign. Suitable modules for performing this functionality may include, for example, an Assessment Module and a Monitoring Module (examples of which are described below). It is to be understood that these are examples of modules of various embodiments, but the functionalities performed by each module as described may be performed by more (or fewer) modules. Further, the functionalities described as being performed by one module may be performed by one or more other modules.

A. Example Elements Related to Privacy

Figure 3:
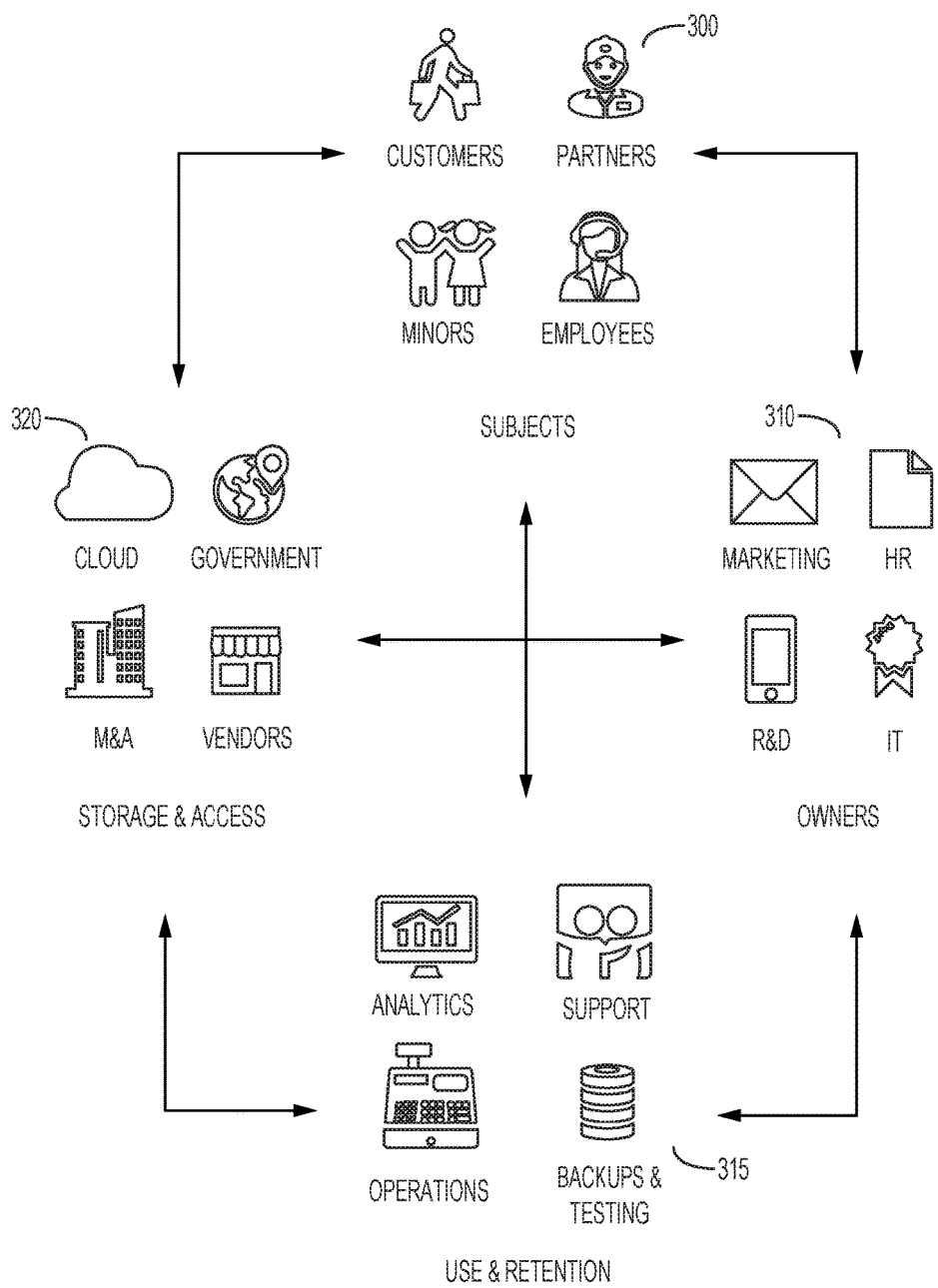
FIG. 3 is a diagram illustrating an example of the different types of individuals that may be involved in privacy compliance.

FIG. 3 provides a high-level visual overview of example "subjects" for particular data privacy assessments, exemplary "owners," various elements related to the storage and access of personal data, and elements related to the use and retention of the personal data. Each of these elements may, in various embodiments, be accounted for by the System 100 as it facilitates the implementation of an organization's privacy compliance policy.

As may be understood from FIG. 3, sensitive information may be collected by an organization from one or more subjects 300. Subjects may include customers whose information has been obtained by the organization. For example, if the organization is selling goods to a customer, the organization may have been provided with a customer's credit card or banking information (e.g., account number, bank routing number), social security number, or other sensitive information.

An organization may also possess personal data originating from one or more of its business partners. Examples of business partners are vendors that may be data controllers or data processors. Vendors may supply a component or raw material to the organization, which may include software applications or database programs, or a website. Vendors may also be outside contractors responsible, for example, for the marketing or legal work of the organization. The personal data acquired from the partner may be that of the partners, or even that of other entities collected by the partners. For example, a marketing agency may collect personal data on behalf of the organization, and transfer that information to the organization. Moreover, the organization may share personal data with one of its partners. For example, the organization may provide a marketing agency with the personal data of its customers so that it may conduct further research.

Other subjects 300 include the organization's own employees. Organizations with employees often collect personal data from their employees, including address and social security information, usually for payroll purposes, or even prior to employment, for conducting credit checks. The subjects 300 may also include minors. It is noted that various corporate privacy policies or privacy laws may require that organizations take additional steps to protect the sensitive privacy of minors.

Still referring to FIG. 3, within an organization, one or more particular individuals (or a particular group of individuals) may be designated to be an "owner" who is in charge of particular "privacy campaigns." A privacy campaign may be, for example, an organized effort to manage personal data obtained from a particular initiative, such as a particular business initiative, that may utilize personal data collected from one or more persons or entities. The owners 310 may have any suitable role within the organization. In various embodiments, an owner of a particular campaign will have primary responsibility for the campaign, and will serve as a resident expert regarding the personal data obtained through the campaign, and the way that the data is obtained, stored, and/or accessed. As shown in FIG. 3, an owner may be a member of any suitable department, including the organization's marketing, Human Resources, Research and Development, or Information Technology department. As will be described below, an organization may employ personnel from a privacy team, who typically operate under the chief privacy officer, or auditors, to carry out privacy assessments or audits.

Referring still to FIG. 3, this figure shows that the use and retention 315 of personal data may include how the data is analyzed and used within the organization's operations, whether the data is backed up, and which parties within the organization are supporting the campaign.

The system may also be configured to help manage the storage and access 320 of personal data. As shown in FIG. 3, a variety of different parties may access the data, and the data may be stored in any of a variety of different locations, including on-site, or in "the cloud", i.e., on remote servers that are accessed via the Internet or other suitable network.

B. Assessment Module

Figure 4:
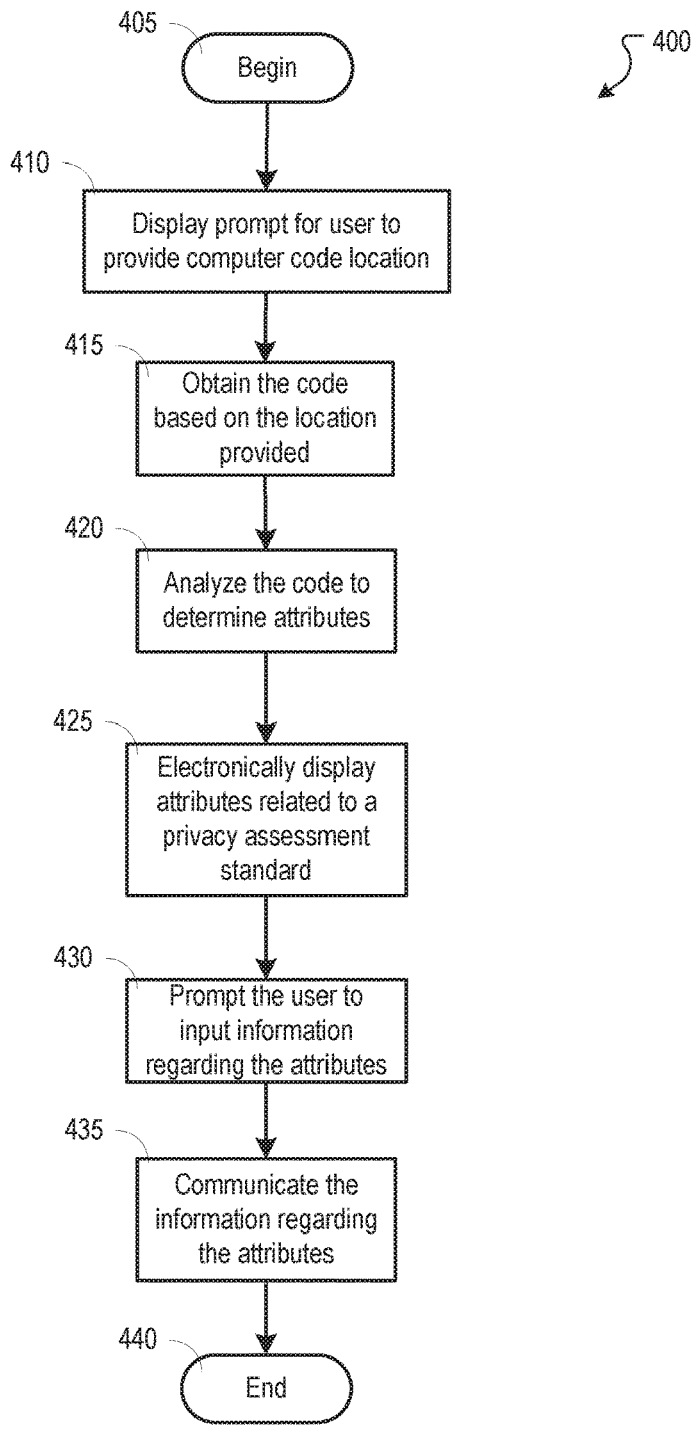
FIG. 4 is a flow chart showing an example of a process performed by the system's Assessment Module.

As noted above, the system may include an Assessment Module for automatically performing privacy assessments of computer code. FIG. 4 illustrates an exemplary process 400, executed by an Assessment Module, for automatically performing privacy assessments of computer code. The process may be executed by one or more computing devices of the System 100. In exemplary embodiments, a server (e.g., server 140) in conjunction with a client computing device having a browser (e.g., computing devices 140, 150, 160, 170, 180, 190) execute the Assessment Module by communicating, as needed, via a network (network 110). In various exemplary embodiments, the Assessment Module may call upon other modules to perform certain functions. In exemplary embodiments, the software may be organized as a single module to perform various computer executable routines.

As mentioned above, disconnects and differences in vernacular might lead to wrong answers to questions during a privacy audit or assessment. To address this issue, in various embodiments, instead of determining whether an organization complies with the defined parameters of a privacy campaign by, for example, conducting an audit as described above (e.g., by asking users to answer questions regarding the privacy campaign, such as: (1) "What personal data is being collected"; or (2) "What cookies are being used on the website", the system (e.g., by executing the Assessment Module) may be configured to automatically determine whether the organization is complying with one or more aspects of the privacy policy. For example, during the audit process, the system may: (1) obtain a copy of computer code (e.g., a software application or an "app") that is collecting and/or using sensitive user information, and then (2) automatically analyze the app to determine whether the operation of the app or website is complying with the terms of the privacy campaign (the privacy assessment standards at issue) that govern the use of the app, website, or other code.

The process of FIG. 4 begins at step 405. The system then advances to step 410, where it displays, on a graphical user interface (e.g., a webpage or dialog box), an instruction (e.g., one or more prompts) for a user to provide the location of computer code, which may be, for example, the code for a software application (e.g., a mobile application) or website, or any other computer code. The user may then, for example, browse to the location of a file that includes the computer code for uploading. If the code involved is that for a website, the system may prompt the user to provide the URL of the website.

At step 415, the Assessment Module may then use the location provided by the user to obtain the computer code (for example, by uploading the file, or obtaining the code directly from a website (e.g., by "scraping" the code from the website)).

Next, at step 420, the Assessment Module automatically electronically analyzes the computer code to determine a plurality of privacy-related attributes of the computer code. The privacy-related attributes (features and/or conditions) of the computer code may relate, for example, to the types of personal information the computer code collects and/or accesses. For example, a particular app may have one or more of the following privacy-related attributes: (1) uses location-based services to detect the location of the user's computing device (e.g., services that may determine the precise longitude and latitude of the user's computing device and/or which of a plurality of predetermined geographical areas the computing device is located in—e.g., the particular U.S. State or Zip Code that the user's computing device is located in); (2) places network calls to another country (e.g., a particular designated country, such as China); (3) uses encryption to protect personal data; (4) issues calls to third party software; (5) accesses communications logs (e.g., call logs, email); (6) uses cookies to track user behavior; and/or (7) collects personal data (e.g., a user's social security number, date of birth, credit card number, physical address, mailing address, email address, IP address, Internet browsing habits, purchase history, biometric data (e.g., finger prints, retinal scans, or other biometric data), and/or personal preferences). The system may use, for example, static analysis, behavior analysis, or some combination of the two, to make the analysis and determination.

The Assessment Module may integrate with a third party system or software (e.g., Veracode), which executes the analysis. As an example, for a software application, after the app is uploaded to the system, the system detects what privacy permissions and data the app is collecting from users.

In response to determining that the app is collecting one or more specified types of personal data, which may be sensitive information (e.g., the location of the user's mobile device), the Assessment Module may automatically request follow up information from the user by posing one or more questions to the user. In the exemplary method of FIG. 4, at step 425, the system may electronically display to the user a list of the privacy-related attributes related to the computer code, wherein each displayed attribute relates to a privacy assessment standard (e.g., privacy policy, privacy law). For example, code related to the collection of personal data such as a person's IP address, may be governed by particular privacy laws.

At step 430, the system may electronically display one or more prompts to the user, wherein each prompt informs the user to input information regarding the attributes. Questions posed by the prompts may include, for example: (1) "For what business reason is the data being collected?"; (2) "How is the app user's consent given to obtain the data?"; (3) "Would app users be surprised that the data is being collected?"; (4) "Is the data encrypted at rest and/or in motion?"; (5) "What would happen if the system did not collect this data?"; and/or (6)"What business impact would it have to not collect this data?" In various embodiments, the system is adapted to allow users to customize these follow-up questions, but the system asks the questions (e.g., the same questions, or a customized list of questions) for each privacy issue that is found for the computer code at issue. The system may also collect other relevant comments regarding the computer code.

At step 435, the information regarding the attributes that were input by the user may be communicated to one or more second users (e.g., one or more software developers, privacy officers, "owners" of the code, or auditors) for an assessment. The information may, for example, help a privacy officer work with a software developer to modify the code to comply with one or more privacy policies, or to draft or modify a privacy policy to be used on a website that implements the code. At step 440, the process 400 may end.

As noted above, in particular embodiments, the system may also, or alternatively, be adapted to scan predetermined software code to automatically determine whether the code, when executed, collects or otherwise uses personal information (e.g., sensitive personal information) and, if so, what types of personal information are being collected. In various embodiments, in response to determining that the code collects certain predetermined types of personal information, the system may associate a particular risk level with the code and/or flag the code to indicate that, before the code is placed into use (e.g., before the code is publically launched and/or before a non-testing version of the code is launched), the code needs to: (1) be modified to not collect one or more types of personal information; and/or (2) be reviewed and approved by an appropriate individual or group (e.g., the individual or group must approve the code including the attribute). Such risk levels and flags may be communicated to users within the context of a risk assessment system, such as one or more of the systems described in U.S. Provisional Patent Application Ser. No. 62/348,695, entitled "Data Processing Systems and Methods for Operationalizing Privacy Compliance and Assessing the Risk of Various Respective Privacy Campaigns and Related Systems and Methods", which was filed on Jun. 10, 2016, and which, as noted above, is incorporated herein by reference in its entirety.

C. Monitoring Module

In various embodiments, after particular computer code is scanned a first time, if the code is subsequently scanned, the system may only scan to code to determine whether any changes have been made to the code since the immediate previous scan of the code. If so, the system may, for example, automatically scan the application, as discussed above, to determine whether the code has changed to add any additional privacy-related attributes. The system may then, for example, automatically notify one or more designated individuals (e.g., privacy office representatives) to indicate that a new version of the app was detected and also inform the one or more designated individuals as to whether the new version of the code added any additional privacy-related attributes since the immediate previous version of the code. In particular embodiments, the notification may also indicate whether the new version of the app was released without a privacy assessment having been performed on the new version.

In particular embodiments, when configuring the desired operation of the Monitoring Module, a user may specify that, if the system identifies a new version of a particular piece of code and determines that the new version of the code has added one or more additional privacy-related attributes, the system will automatically prompt a user (e.g., as discussed above) for information regarding the newly-added privacy-related attributes. The system may then use this information as discussed above (e.g., it may send the information to a privacy officer or other individual who is responsible for the privacy aspects of the computer code).

Figure 5:
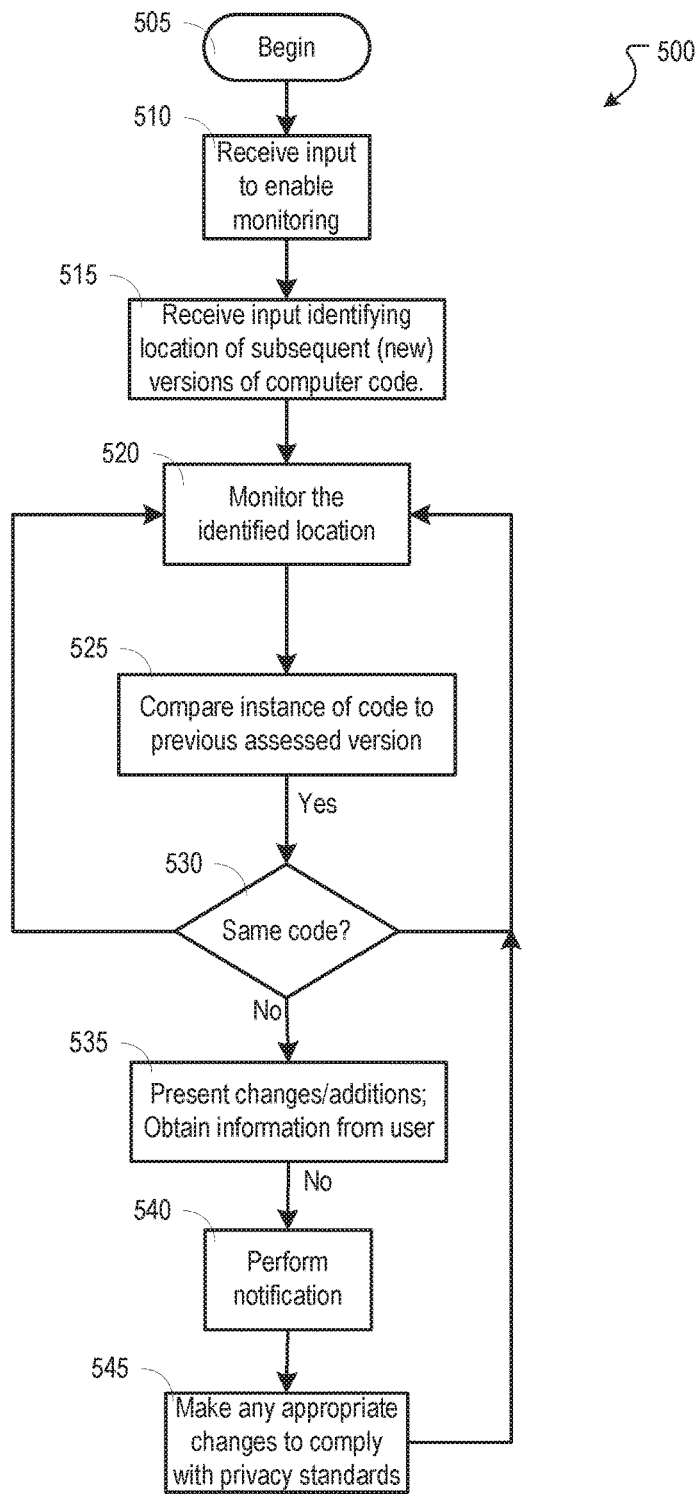
FIG. 5 is a flow chart showing an example of a process performed by the system's Monitoring Module.

Various steps executed by the Monitoring Module are shown in the flowchart of FIG. 5. Turning to this figure, the process 500 begins at step 505. Next, at step 510, the system may receive an electronic input from the user indicating that they wish to have the system monitor particular computer code for changes.

At step 515, the system prompts for and receives from the user an electronic input identifying the location of the new versions of computer code. In various embodiments, the system is adapted to (optionally) automatically monitor (e.g., continuously monitor) locations that may be one or more online software application marketplaces (such as the Microsoft Store, the Google Play Store, or Apple's App Store) to determine whether the application has changed (e.g., a new version of the application is available).

In various embodiments in which the computer code comprises a website, the location may be a website's URL, and the Monitoring Module may prompt the user to enter the URL of the web site to be analyzed. For example, the Monitoring Module may prompt the user to "Provide the URL of the Website to be Monitored."

While the system may analyze every directory or level in the website, the system may, optionally, separately monitor, for changes in the content of a web page that includes the privacy policy that applies to the website.

Often, an organization's privacy team (privacy office) and/or legal department may provide web developers with the terms of the privacy policy. However, it is not uncommon for an organization's marketing team or outside creative agency to take it upon themselves to make changes by rewording the policy, or repositioning content on a particular web page. Because the location, placement, wording, and/or content of privacy policies may be governed by law, there is reason to monitor changes to both the content of such privacy policies and their placement on related web pages. Monitoring the privacy page of a website may be beneficial, for example, in Mexico, which requires the content of the policy to contain the word "privacy" and for that word to be displayed in the bottom right hand portion of the policy page.

At step 520, the Monitoring Module monitors the identified location for any new instances (i.e., potential new versions) of the computer code. If the system detects a new instance of the computer code located in the identified location, it compares the obtained instance of computer code to a previous assessed version of the computer code (e.g., the most recent version of the computer code that was previously assessed by the system). During this scanning, the Monitoring Module may also determine any privacy-related attributes of the computer code. In the case of a website, the Monitoring Module may, for example, continuously monitor the specified website site for cookies, and/or for whether other tracking mechanisms, such as fingerprinting technologies and/or 3rd party SDKs, are used.

At step 525, the Monitoring Module uses the analyzed information to compare the code that was obtained with a previously assessed version of the computer code. At 530, the Monitoring Module determines whether the currently-obtained instance of computer code is different than the previously assessed version of the computer code (which would be indicative of a new version of the software). In various embodiments related to monitoring of a privacy policy link, the Monitoring Module may also auto-detect whether any changes have been made to the privacy policy or the location of the privacy policy link on the page.

If no differences are detected, then the process 500 may proceed back to step 520 wherein the Monitoring Module monitors for new instances of computer code again. If there is a difference between the obtained instance and the immediate previously assessed version of the computer code, then at 535, the system may notify a user that a change in versions of the software code has been detected, and prompt the user to obtain information regarding the new version of computer code (e.g., the reason for the new code, whether the new code is necessary, etc.).

Alternatively, at step 535, the Monitoring Module may automatically analyze the computer code and electronically present the user with a list of differences between the obtained instance of computer code and the previous assessed version of the computer code. For example, the Monitoring Module may prompt the user for information regarding the privacy-related attributes that have changed or been added. In various embodiments, the Monitoring Module may ask the user to complete a series of one or more follow-up questions for each of these changed or added privacy-related attributes found during the scan of the app, or website. For example, the system may ask the reason the new privacy-related attribute is in the code, whether the code may be changed back to eliminate the attribute, etc.

At 540, any information obtained from step 535 may be communicated to one or more second users (e.g., one or more software developers, privacy officers, or auditors) for use in further privacy-related decision-making as described above. In various embodiments, the system is configured to, for example, generate an alert to an appropriate individual (e.g., a designated privacy officer) to inform them of the change(s) to the computer code and provide them with the obtained information regarding the changes as described above.

At 545, appropriate changes to the code may be made to comply with privacy standards if the campaign owners decide that the computer code is noncompliant. The privacy officer may use this information, for example, to determine whether to modify the privacy policy for the website or to coordinate discontinuing use of the new tracking technologies and/or SDKs. and, in response to auto-detecting such changes, trigger an audit of the project.

Exemplary User Experience

Figure 6A:
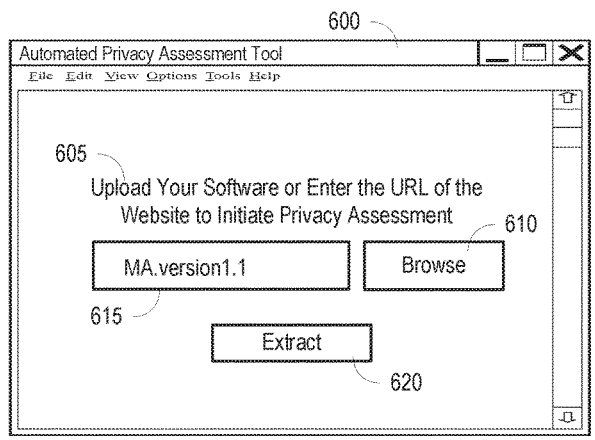
FIG. 6A is an example of a graphical user interface that shows the identification of the location of computer code.
Figure 6B:
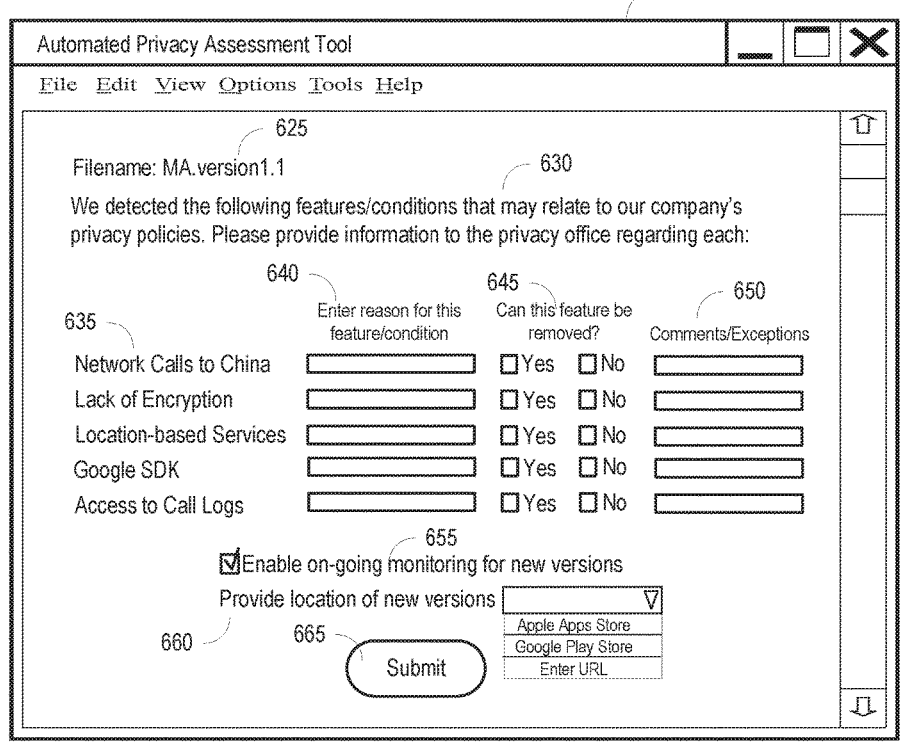
FIG. 6B is an example of a graphical user interface that shows the identification of the location of computer code the results of an assessment.

FIGS. 6A and 6B illustrates an example of a graphical user interface (GUI) for performing automated privacy assessments. The method includes displaying on an Assessment GUI 600 (e.g., a webpage or dialog box) an instruction 605 (or prompts) for a user to provide the location of computer code, which may be, for example, a software application (e.g., a mobile application, a database application), or a website. For example, the system may prompt a user with an "Upload Your Software or Enter the URL of the Website to Initiate Privacy Assessment" message. The user may use the browse button 610 to browse to the location of a file that includes the computer code for uploading. When the file is selected, the name of the file may appear in a computer code entry field 615 so as to display to the user the file that will be uploaded. If the code involved is a website, the user may provide the URL of the website for which privacy assessment is desired. Once the user selects the "Extract" button 620, the system electronically obtains the computer code. The "Extract" button 620 may, alternatively, bear another label, such as "Import," "Upload,", "Obtain," etc.

The system then automatically electronically analyzes the computer code to determine one or more attributes of the computer code. The attributes (features and/or conditions) of the computer code may relate to location-based services, network calls to another country (e.g., China), encryption (or lack thereof), third party software (e.g., libraries, SDKs), access to communications logs (e.g., call logs, email), tracking (e.g., cookies), and personal data collection (wherein the personal data may be a social security number, date of birth, credit card number, physical address, mailing address, email address, IP address, Internet browsing habits, purchase history, biometric data (e.g., finger prints or retinal scans), and personal preferences. The system may use, for example, static analysis, behavior analysis, or some combination of the two, to make the analysis and determination.

Next, as shown in illustrative FIG. 6B, the system may electronically display to the user, in assessment GUI 600, a list of the attributes related to the computer code, wherein each displayed attribute relates to a privacy assessment standard (e.g., privacy policy, privacy law). The assessment GUI 600 may display, for example, an identifier (e.g., a file name) associated with the computer code 625 that was assessed (if the assessment involved a website, the URL of the website may be displayed). The assessment GUI 600 may also display some informative indication 630 to the user that the analysis revealed certain features or conditions (e.g., attributes) of the code that may have an impact on one or more of the company's privacy polies (or relevant privacy laws). In example 6B, the system may electronically display a list of attributes 635, along with a plurality of prompts to the user, wherein each prompt informs the user to input information regarding the attributes, and other relevant comments. As mentioned above, a user may be prompted to answer a plurality of questions, including for each attribute. In the exemplary embodiment show in FIG. 6B, the user is presented with a prompt 640 to enter the reason the code has the attribute, a prompt 645 to select whether the attribute may be eliminated (e.g., check "Yes" or "No"), and a prompt 650 to enter in any comments or exceptions relating to the attribute. Each prompt may have one or more entry fields, check boxes, and the like, associated with it. The information regarding the attributes that was input by the user may be communicated to one or more second users (e.g., software developers, privacy office personnel, or auditors) for an assessment. In the example shown, the user may select the submit button 665 to communicate this information.

In the example shown in FIG. 6b, prior to selecting the submit button 665, a user of the system (e.g., or software developer, a privacy office team member, or auditor,) may respond to the prompt 655 by electing to automatically monitor subsequent computer code versions of the code by selecting the check box associated with the prompt 655. The system may display a prompt 660 asking for the user to input the location of the new versions of computer code. In various embodiments, a drop-down selector may be used to facilitate entering the location, which may be an on-line application store, such as the Microsoft Store, Google Play Store, Apple App Store, or in the case of a website, a URL. The system then periodically (or in the alternative, continuously) monitors the identified location for any instances (e.g., potential new versions) of the computer code. The system then compares code obtained from the location to a previous assessed version of the computer code.

Figure 7:
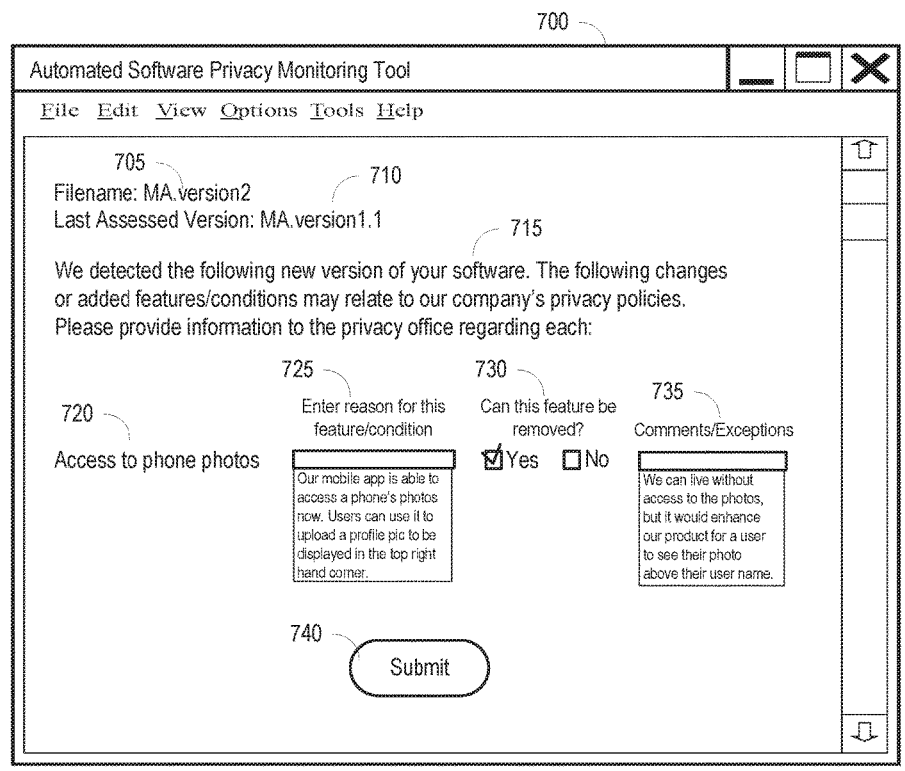
FIG. 7 is an example of a graphical user interface that shows the results of the ongoing monitoring of computer code.

FIG. 7: Collaborator Assignment Notification and Description Entry

Referring to FIG. 7, if an obtained instance of computer code is different than the immediate previously privacy-assessed version of the computer code, then the system may display a GUI 700 that shows the results of the analysis and prompts for and obtains information regarding any new or changed attributes discovered. The GUI 700 may display the name 705 of the new version (if a name and version number was detected), as well as the name 710 of the previous version of the computer code. The GUI 700 may provide an informative statement 715 indicating, for example, "We detected the following new version of your software. The following changes or added features/conditions may relate to our company's privacy policies. Please provide information to the privacy office regarding each." In various exemplary embodiments, the monitoring module may simply ask the user for information regarding the new version of computer code (e.g., the reason for the new code). The system may display a prompt that states, for example, "We have detected a new version of software from the original. Please let us know what has changed."

The system may also, after analyzing the computer code for differences, present the user with a list of differences, and obtain information regarding the attributes that have changed or been added. In Example 7, the system may electronically display a list of attributes 720 (here, only one attribute is listed—"Access to phone photos"), along with a plurality of prompts to the user, where each prompt informs the user to input information regarding the attributes, and other relevant comments. As mentioned above, numerous questions may be prompted, including for each attribute. In the exemplary embodiment shown in FIG. 7, the user is presented with a prompt 725 to enter the reason the attribute is in the code, a prompt 730 to select whether the attribute may be eliminated (e.g., check "Yes" or "No"), and a prompt 735 to enter in any comments or exceptions relating to the attribute. Each prompt may have one or more entry fields, check boxes, and the like, associated with it. The information regarding the attributes that was input by the user may be communicated (e.g., notified, alerted, etc.) to one or more second users (e.g., privacy office personnel, auditors, etc.) for an assessment. In the example shown, the user may select the submit button 740 to communicate this information to the one or more second users (e.g., privacy office personnel, auditors, etc.) for use in determining how to move forward in accordance with the applicable privacy policies.

Conclusion

Although embodiments above are described in reference to various systems and methods for performing privacy assessments and monitoring new versions of computer code for updated features and conditions that relate to compliance with privacy standards, it should be understood that various aspects of the system described above may be applicable to other privacy-related systems, or to other types of systems, in general. While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and assessing risk of privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer system for use in automatically monitoring computer code for changes within the context of privacy management, the computer system comprising:
   one or more computer processors;
   computer memory operatively coupled to the one or more computer processors, wherein the computer system is configured for:
   monitoring, by one or more computer processors, one or more computer storage locations to determine whether any new versions of particular computer code have been stored in the one or more computer storage locations by executing the data processing steps of:
   (A) receiving an indication that new computer code has been stored in the one or more computer storage locations; and
   (B) comparing the contents of the new computer code with one or more versions of the particular computer code that have been assessed as a part of a previous privacy assessment, and
   in response to determining that the contents of the new computer code are different from the contents of the one or more versions of the particular computer code that have been assessed as a part of a previous privacy assessment, communicating, by the one or more computer processors, an alert to a user indicating that a new version of the particular computer code exists; and
   in response to determining that the contents of the new computer code are different from the contents of the one or more versions of the particular computer code that have been assessed as a part of a previous privacy assessment:
   automatically electronically analyzing, by the one or more computer processors, the new computer code to determine one or more privacy-related attributes of the new computer code, each of the privacy-related attributes indicating one or more types of personal information the new computer code collects or accesses;
   electronically displaying to an individual, by the one or more computer processors, a list of the one or more privacy-related attributes of the new computer code;
   electronically displaying, by the one or more computer processors, one or more prompts to the individual, wherein each prompt informs the user to input information regarding one or more particular attributes of the one or more privacy-related attributes; and
   communicating, by the one or more computer processors, the information regarding the particular privacy-related attributes to one or more second individuals for use in conducting a privacy assessment of the new computer code.

2. The computer system of claim 1, wherein the one or more computer storage locations comprise an app store.

3. The computer system of claim 1, wherein the one or more computer storage locations comprise a designated folder in computer memory.

4. The computer system of claim 1, wherein the new computer code is computer code that is associated with a website and the one or more storage locations comprises a URL.

5. The computer system of claim 4, wherein the computer system is further configured for:
   monitoring, by the one or more computer processors, a location of a privacy policy on the website; and
   in response to the location of the privacy policy satisfying one or more specified criteria, communicating, by the one or more computer processors, an alert to a user.

6. The computer system of claim 5, wherein the one or more specified criteria comprise the location of the privacy policy being different from a specified location on the website.

7. A computer system for use in automatically monitoring computer code for changes within the context of privacy management, the computer system comprising:
   at least one processor; and
   memory operatively coupled to the at least one processor, wherein the computer system is configured for:
   monitoring one or more computer storage locations to determine whether any new versions of particular computer code have been stored in the one or more computer storage locations by executing the data processing steps of:
   (A) receiving an indication that new computer code having an identifier associated with the particular computer code has been stored in the one or more computer storage locations; and
   (B) comparing the contents of the new computer code with one or more versions of the particular computer code that have been assessed as a part of a previous privacy assessment, and
   in response to determining that the contents of the new computer code are different from the contents of the one or more versions of the particular computer code that have been assessed as a part of a previous privacy assessment:
   automatically electronically analyzing the new computer code to determine whether the new computer code has any one of a specified plurality of privacy-related attributes; and in response to determining that the new computer code has a particular one of the specified plurality of privacy-related attributes: (A) executing the steps of: (i) electronically displaying one or more prompts to a user requesting that the user input information regarding the particular privacy-related attribute; (ii) receiving input information from the user regarding the particular privacy-related attribute; and (iii) communicating the input information to a second user for use in a privacy assessment of the new computer code; (B) changing an indicator associated with the new computer code to indicate that, before the new computer code is launched, the attribute should be reviewed by one or more designated individuals; and (C) changing an indicator associated with the new computer code to indicate that, before the new computer code is launched, the new computer code should be modified to not include the particular privacy-related attribute.

8. The computer system of claim 7, wherein the particular privacy-related attribute is that the new computer code collects information regarding the web browsing habits of users of the new computer code.

9. The computer system of claim 7, wherein the information regarding one or more particular attributes comprises a reason that the new computer code has the one or more attributes.

10. The computer system of claim 7, wherein the one or more computer storage locations comprises an app store.

11. The computer system of claim 7, wherein the one or more computer storage locations comprises a designated folder in computer memory.

12. The computer system of claim 7, wherein the new computer code is computer code that is associated with a website and the one or more storage locations comprises a URL.

13. A computer-implemented data processing method for use in automatically monitoring computer code for changes within the context of privacy management, the method comprising:
monitoring, by one or more computer processors, to determine whether any new versions of particular computer code exist in one or more computer storage locations;
in response to determining that one or more new versions of the particular computer code exist in the one or more computer storage locations:
(A) automatically electronically, by one or more computer processors, analyzing the one or more new versions of computer code to determine one or more privacy-related attributes of the one or more new versions of computer code, each of the one or more privacy-related attributes indicating one or more types of personal information the one or more new versions of computer code collects or accesses;
(B) electronically displaying to an individual, by one or more computer processors, a list of the determined one or more privacy-related attributes;
(C) electronically displaying, by one or more computer processors, one or more prompts to an individual wherein each prompt informs the individual to input information regarding the one or more attributes; and
(D) communicating, by one or more computer processors, the information regarding the one or more privacy-related attributes to one or more second individuals for use in conducting a privacy assessment of the new computer code.

14. The computer-implemented data processing method of claim 13, further comprising, in response to determining that one or more new versions of the computer code exist in the one or more computer storage locations:
automatically electronically, by one or more computer processors, analyzing the one or more new versions of the computer code to determine whether the one or more new versions of the computer code has a particular one of a specified plurality of privacy-related attributes; and
in response to determining that the one or more new versions of the computer code has the particular privacy-related attribute: (A) changing, by one or more computer processors, an indicator associated with the one or more new versions of the computer code to indicate that, before the one or more new versions of the computer code is launched, the attribute should be reviewed by one or more designated individuals; and
(B) changing, by one or more computer processors, an indicator associated with the one or more new versions of the computer code to indicate that, before the one or more new versions of the computer code are launched, the one or more new versions of the computer code should be modified to not include the one or more particular attributes.

15. The computer-implemented data processing method of claim 14, wherein the particular privacy-related attribute is that the one or more new versions of the computer code collects information regarding the location of users of the one or more new versions of the computer code.

16. The computer-implemented data processing method of claim 14, wherein the particular privacy-related attribute is that the one or more new versions of the computer code collects information regarding the web browsing habits of users of the new computer code.

17. The computer-implemented data processing method of claim 14, wherein the information regarding one or more particular attributes comprises a reason for having the new computer code have the one or more attributes.

18. The computer-implemented data processing method of claim 13, wherein the one or more computer storage locations comprises an app store.

19. The computer-implemented data processing method of claim 13, wherein the one or more computer storage locations comprises a designated folder in computer memory.

20. The computer-implemented data processing method of claim 13, wherein the one or more new versions of the computer code is computer code that is associated with a web site and the one or more storage locations comprises a URL.

* * * * *